(12) United States Patent
Rieger et al.

(10) Patent No.: US 6,619,731 B2
(45) Date of Patent: Sep. 16, 2003

(54) VEHICLE ROOF

(75) Inventors: Peter Rieger, Aschaffenburg (DE); Joachim Röder, Mühlheim (DE); Bernard Audibert, Frankfurt (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/114,431

(22) Filed: Apr. 2, 2002

(65) Prior Publication Data

US 2002/0167203 A1 Nov. 14, 2002

(30) Foreign Application Priority Data

Apr. 3, 2001 (DE) .......................................... 101 16 593

(51) Int. Cl.[7] .............................................. B62D 25/00
(52) U.S. Cl. ...................................... 296/214; 296/210
(58) Field of Search ................................ 296/214, 210, 296/107.06

(56) References Cited

U.S. PATENT DOCUMENTS 3,635,519 A    1/1972   Foster et al.
5,120,593 A    6/1992   Kurihara
6,378,936 B1   4/2002   Grimm et al.

FOREIGN PATENT DOCUMENTS

DD        257 035 A5    6/1988

OTHER PUBLICATIONS

European Search Report dated Jul. 18, 2002.

*Primary Examiner*—Joseph D. Pape
(74) *Attorney, Agent, or Firm*—Carlson, Gaskey & Olds

(57) ABSTRACT

A vehicle roof designed in particular for motor vehicles, in particular a roof module to be manufactured separately from the bodywork and connected with the bodywork frame, which roof module consists substantially of a rigid roof skin, optionally an inner shell of foamed plastic material foamed thereon and a decorative roof liner of foamed plastic material. The roof module may be provided with an integral sunroof unit. The particular feature thereof is that the roof liner may be produced separately from the roof module and may be brought into releasable engagement with the inner shell or optionally with the sunroof frame of the sunroof unit by means of complementary, precisely fitting guide elements, i.e. may be replaced.

9 Claims, 5 Drawing Sheets

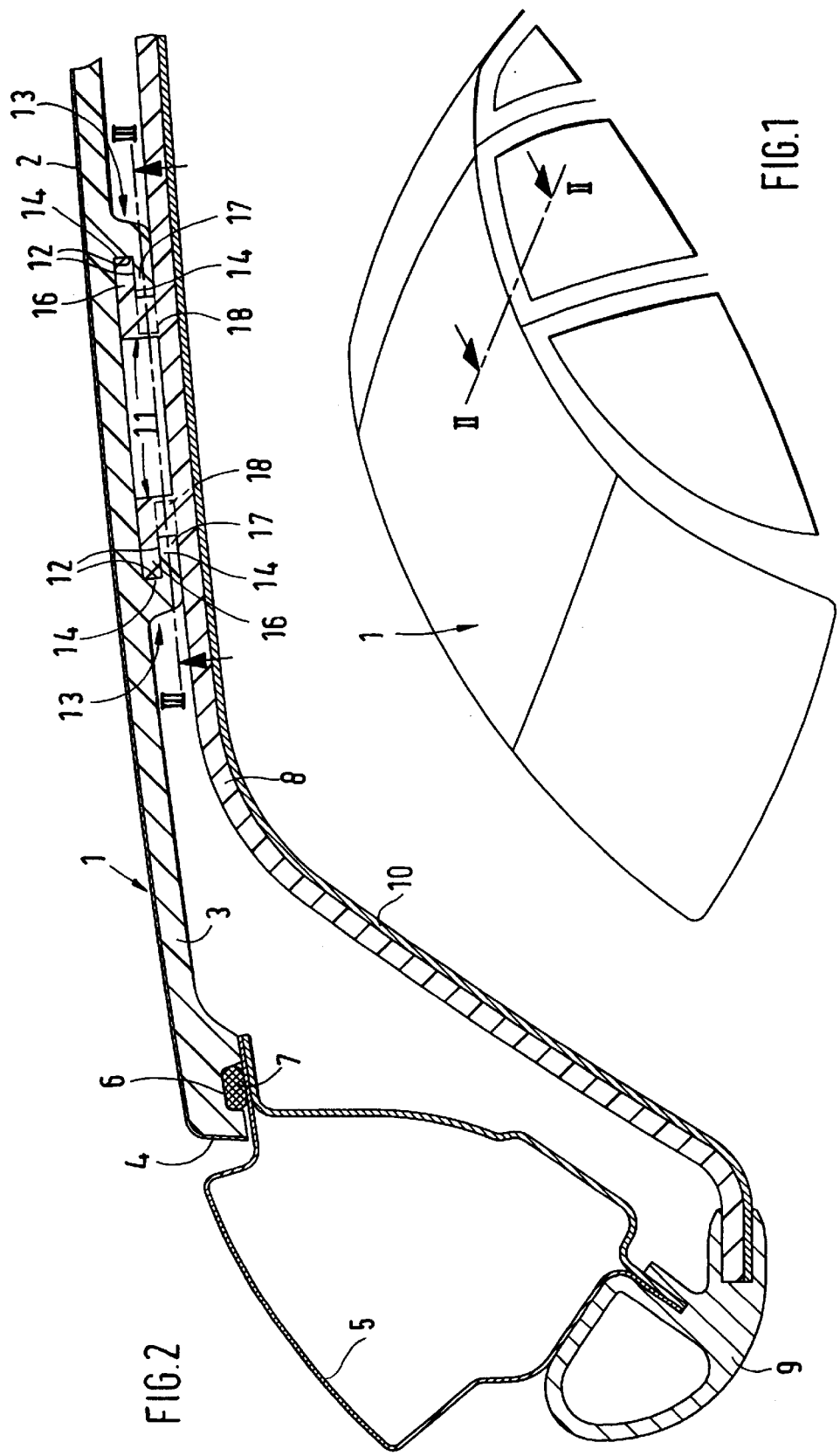

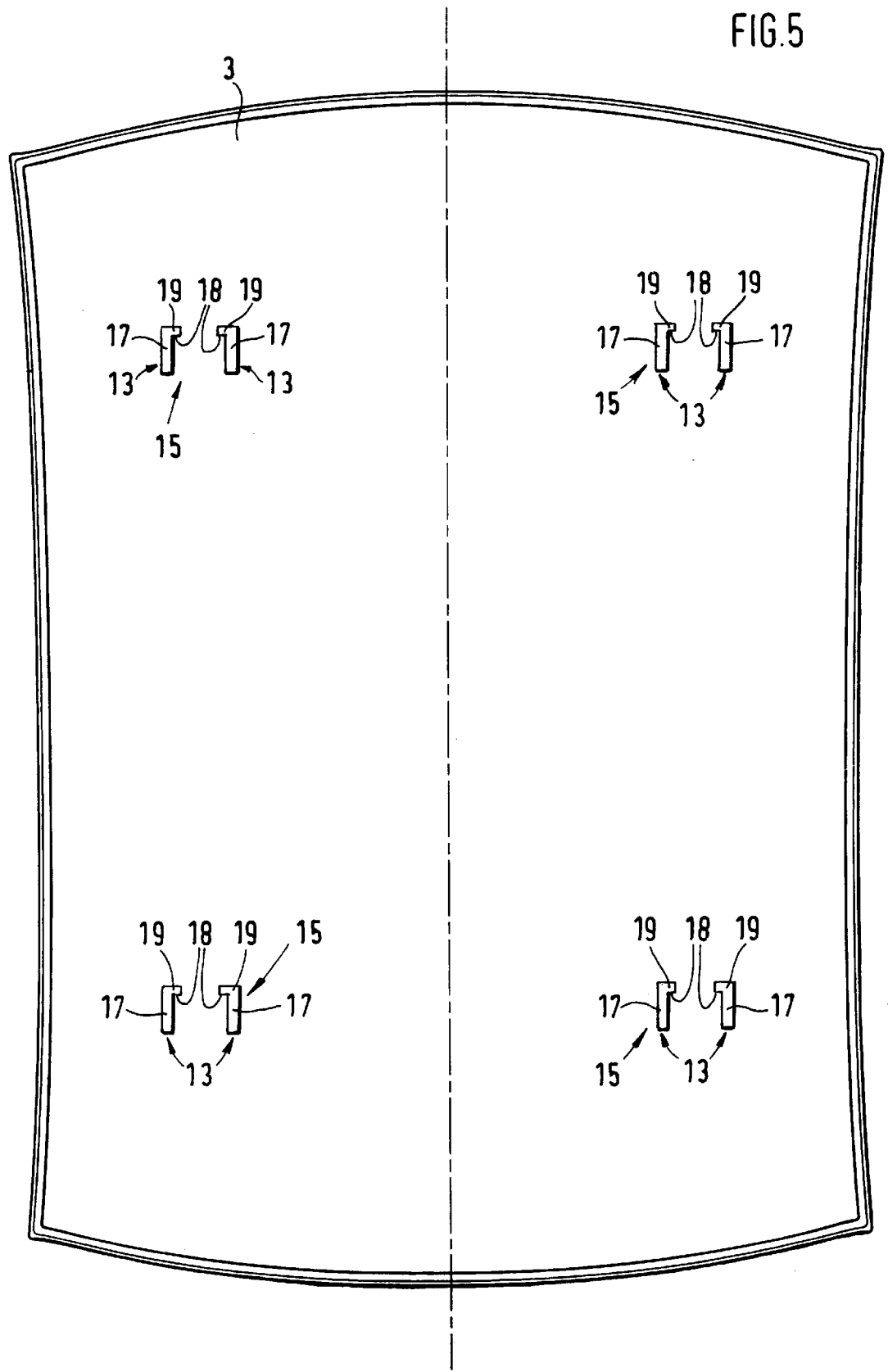

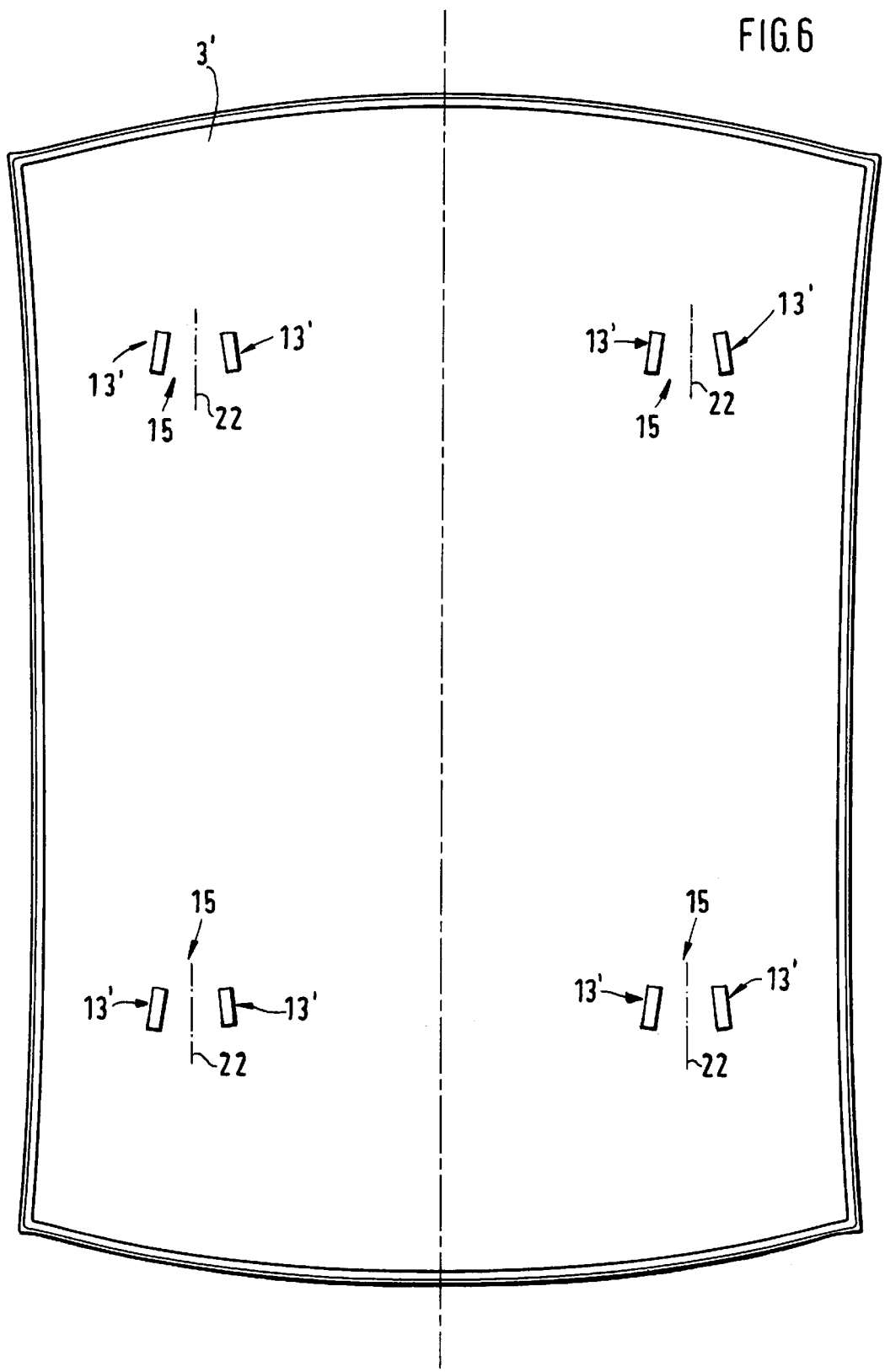

VEHICLE ROOF

BACKGROUND OF THE INVENTION

The invention relates to a vehicle roof, in particular for motor vehicles, where a rigid roof skin is provided, there being an inner shell of plastic material foamed onto an inner surface thereof. The roof liner is connection with the inner shell.

The preferred field of application of the invention is vehicle roof modules which are made separately from the vehicle bodywork and only connected with the vehicle bodywork on the assembly line at the automobile factory. Such vehicle roof modules are becoming increasingly popular in particular owing to a considerable reduction in assembly times on the assembly line. If such vehicle roof modules are provided with an integral sunroof unit, separate manufacture opens up the advantageous possibility of checking functioning of the pre-assembled sunroof unit before the roof module is connected with the bodywork.

BRIEF DESCRIPTION OF THE PRIOR ART

With a known vehicle roof of this type (DE 197 09 016 A1), the roof liner is either an inseparable component of the inner shell foamed onto the roof skin, if no sunroof unit is provided, or it is attached to the sunroof frame, if a sunroof unit is provided. In any case, no provision is made in either embodiment for the roof liner to be replaceable, as may however be desirable for various reasons. For instance, the roof liner could be made to match different interior vehicle trim, without different complete roof modules having to be held in stock. It may also be desirable to replace a damaged or soiled roof liner, without having to remove the complete roof module for the purpose.

According to one proposal, not a prior publication, for such a vehicle roof (DE 199 47 238.6), the roof liner preformed from foamed plastic material as a separate component is provided on its upper side with catch elements, which are locked together releasably with complementary, precisely fitting catch elements attached to the inner shell. According to this proposal, if the vehicle roof is provided with a sunroof unit, the roof liner is provided on its upper side with catch elements, which are locked together releasably with complementary, precisely fitting catch elements attached to the sunroof frame. Connection together by catch allows damage-free removal of the respective roof liner by release of the catch connection. In this way, not only is it possible to replace the roof liner, but the roof module may also initially be handled without roof liner, which simplifies the attachment thereof to the vehicle bodywork. A roof liner matching the interior trim of the vehicle in the decorative design of its lower surface may then be mounted on the roof module.

SUMMARY OF THE INVENTION

The object of the invention is to provide a roof liner for a vehicle roof with or without sunroof unit which may be mounted and replaced in another manner.

The term "sunroof", used here alone or in phrases, is intended, for the purposes of the present invention, to cover not only designs in which the cover may be slid under the fixed rear roof surface to uncover the roof opening after lowering of its rear edge but also slide and lift sunroofs, in which the cover may additionally be tilted from its closed position about a tilt axis provided in the vicinity of its front edge so as to project above the fixed roof surface. Front-hinged covers which open out in the manner of ventilation shutters and sliding sunroofs in which the cover may be slid partially over the rear fixed roof surface to uncover the roof opening after lifting of its rear edge are also included. The same also applies to multi-cover roof designs. In principle, it applies to all designs, in which a sunroof frame attached beneath the fixed roof surface is present.

According to one aspect of the present invention, there is provided a vehicle roof, in particular for a motor vehicle, the vehicle roof having a rigid roof skin defining an inner surface and an inner shell of plastic material foamed onto the inner surface thereof, there being a roof liner connected with the inner shell, wherein the roof liner is preformed from foamed plastic material as a separate component and has an upper side that is provided on its upper side with rail-like first guide elements comprising undercut sliding surfaces, with which first guide elements there are associated complementarily constructed rail-like second guide elements on the inner shell, likewise comprising undercut sliding surfaces, and wherein, to attach the roof liner to the inner shell, the first guide elements are slid in parallel onto the second guide elements, with their respective undercut sliding surfaces in engagement, as far as a defined relative position of inner shell and roof liner.

According to a second aspect of the present invention, there is provided a vehicle roof, in particular for a motor vehicle, the vehicle roof having a rigid roof skin and a sunroof frame of a sunroof unit that is firmly connected with the roof skin, there being a roof liner connected with the sunroof frame, wherein the roof liner is preformed from foamed plastic material as a separate component and has an upper side that is provided on its upper side with rail-like first guide elements comprising undercut sliding surfaces, with which first guide elements there are associated complementarily constructed rail-like second guide elements on the sunroof frame, likewise comprising undercut sliding surfaces, and wherein, to attach the roof liner to the sunroof frame, the first guide elements are slid in parallel onto the second guide elements, with their respective undercut sliding surfaces in engagement, as far as a defined relative position of sunroof frame and roof liner.

Common to the two configurations defined above is the fact that the respective roof liner is provided on its upper side with rail-like first guide elements, which comprise undercut sliding surfaces. Associated in complementary manner with these first guide elements are rail-like second guide elements, which likewise comprise undercut sliding surfaces. In the case of the vehicle roof in accordance with the first aspect of the invention, the two guide elements are arranged on the inner shell, while in the case of the vehicle roof according to the second aspect of the invention, the second guide elements are provided on the sunroof frame. Also common to both configurations is the fact that, to attach the roof liner to the inner shell or the sunroof frame respectively, the first guide elements are slid in parallel onto the second guide elements, with their respective undercut sliding surfaces in engagement, as far as a defined relative position of inner shell or sunroof frame and roof liner. By sliding in the opposite direction, the roof liner may be detached again in equally simple manner.

The rail-like first guide elements each project upwards out of the roof liner and the second guide elements each project downwards out of the inner shell or the sunroof frame respectively and take the form of short profile portions. These are provided in pairs at each of their attachment locations, that is to say not only the first guide elements relative to one another and the second guide elements relative to one another but also the first relative to the second guide elements, i.e. the first guide elements and the second guide elements in each case form pairs at each attachment location, while each pair of first guide elements at the attachment location in question also forms a pair with the associated pair of second guide elements.

The rail-like first guide elements and the rail-like second guide elements preferably each take the form of angular profile portions, wherein the arms parallel to the roof liner of the first guide elements point in opposite directions, while the arms parallel to the inner shell or sunroof frame of the second guide elements point towards one another. In this way, the guide elements come into form-fitting engagement when the first guide elements are slid onto the second guide elements during roof liner mounting, in which form-fitting engagement the undercut sliding surfaces lie flat against one another. Comparable form-fitting engagement between the first and second guide elements may also be achieved if the respective undercut sliding surfaces engage together in the manner of a dove-tail joint.

In a first embodiment of the invention, the first and second guide elements are arranged parallel to one another in pairs at each attachment location and parallel to one another at all the attachment locations. Thus, all the guide elements are oriented parallel to one another, which orientation corresponds to the sliding-on direction during roof liner mounting or the sliding-off direction during removal of the roof liner. In order to achieve precise positional fixing between the roof liner and the inner shell or the sunroof frame, limit stops may be attached to the first or second guide elements, which limit the sliding-on distance.

A second embodiment of the invention, provides that the first and second guide elements be arranged at each attachment location so as to converge congruently in pairs in the direction of cover displacement with regard to the associated surfaces, i.e. the guide elements form equal angles in the manner of arrows at each pair of first guide elements and at each pair of second guide elements. When the roof liner is attached, the displacement path thereof is limited in the desired relative position between the roof liner and the inner shell or the sunroof frame by meeting of the associated surfaces.

The first guide elements are advantageously formed from the foamed plastic material of the roof liner itself and the second guide elements are formed from the foamed plastic material of the inner shell itself and are thus in each case in one piece. If the vehicle roof is provided with a sunroof unit, the arrangement may be such that the first guide elements are formed from the foamed plastic material of the roof liner itself and thus in one piece, while the second guide elements take the form of profile portions of the sunroof frame or are attached as separate components thereto.

Alternatively, the construction may also be such that the first guide elements and/or the second guide elements are attached to the inner shell as initially separate profile portions by foam-embedding in the plastic material of the roof liner and/or in the plastic material of the inner shell.

BRIEF DESCRIPTION OF THE DRAWINGS

For a better understanding of the invention and to show how the same may be carried into effect, reference will now be made, by way of example, to the accompanying drawings, in which:

FIG. 1 is a perspective view of a vehicle roof without sunroof unit;

FIG. 2 shows a broken-away section through the vehicle roof along section line II—II in FIG. 1;

FIG. 5 is a view from below of the inner shell with the second guide elements corresponding to the first embodiment;

FIG. 6 is a view from below of the inner shell with the second guide elements corresponding to the second embodiment;

DESCRIPTION OF THE PREFERRED EMBODIMENT

Figure 4:
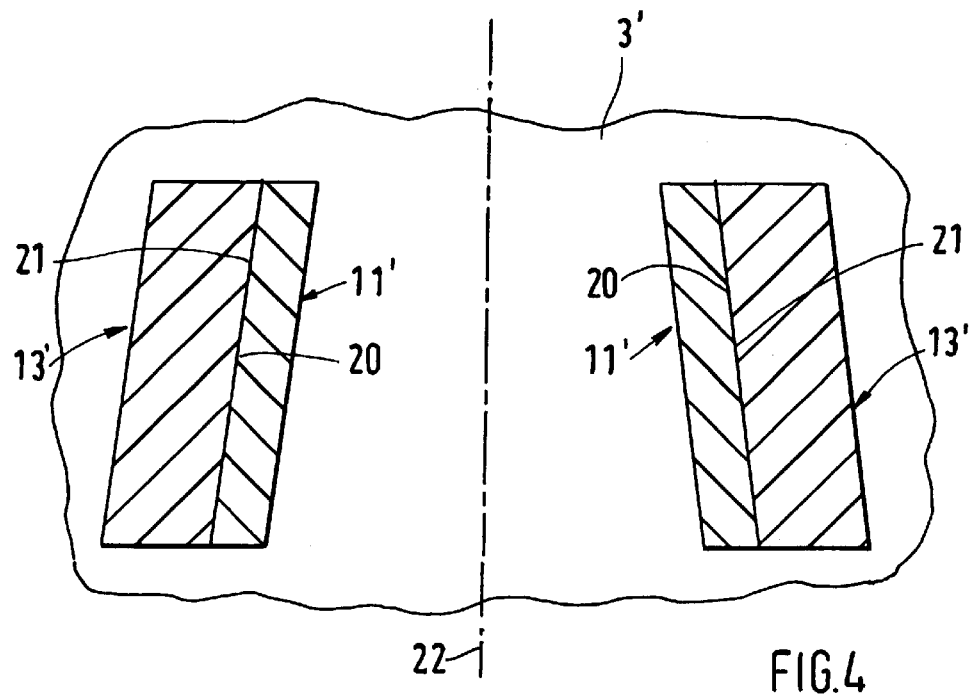
FIG. 4 shows a broken-away section through the first and second guide elements corresponding to the second embodiment, likewise along section line III—III in FIG. 2.

FIGS. 2 to 4 and 8 show portions of vehicle roof modules each with mounted roof liners.

FIG. 2 shows a roof module 1, in which a rigid roof skin 2, which may be made of deep-drawn metal sheet, for example aluminum sheet, or a vacuum-formed plastic film, is provided with a foamed inner shell 3 on its inner surface. Suitable materials for the inner shell are PU-based rigid plastic foams, which may be reinforced with fibers incorporated in the plastic material prior to foaming, for example glass fibre sections. However, wovens, knits, nonwovens etc inserted into the foaming mold are also suitable as reinforcement. Foaming of the reinforced inner shell 3, which extends as far as a beveled edge 4 of the roof skin 2, produces a sandwich-like composite roof module exhibiting high dimensional stability and strength. All the inner contours of the inner shell 3, including the guide elements still to be described, are formed during the foaming process by appropriate shaping of the foaming mold. For instance, the inner shell 3 is provided in the edge area thereof adjoining the beveled edge 4, with which edge area it is positioned on a bodywork frame 5, with a circumferential, molded-in receiving groove 6, in which there is accommodated an adhesive bead 7 sealing the roof module 1 relative to the bodywork frame 5 and attaching the former to the latter.

Associated with the roof module 1 thus formed is a separately produced roof liner 8, which is preformed in the exemplary embodiment shown in FIG. 2 from a foamed plastic material and comprises areas covering the bodywork frame 5. Connection of these areas with the bodywork frame 5 may be effected by a connecting weather-strip 9, which may at the same time comprise a cavity portion for sealing the adjacent vehicle door (not shown) relative to the bodywork frame 5. The roof liner 8 may likewise be molded from a foamed plastic material, for example a PU-based plastic material. In addition, the foamed plastic material of the roof liner 9 may be reinforced in the manner described in relation to the inner shell 3. The roof liner 8 may be of decorative design on its lower surface, for example it may be provided with a coating 10 of textile material or of a plastic film.

The roof liner 8 is provided on its upper side with rail-like first guide elements 11, which comprise undercut sliding surfaces 12. Associated with the first guide elements 11 are complementary rail-like second guide elements 13 on the inner shell 3. These second guide elements 13 likewise comprise undercut sliding surfaces 14. At the time of mounting of the roof liner 8, the latter is slid with its first guide elements 11 onto the second guide elements 13 of the inner shell 3 in the longitudinal direction of the vehicle, wherein the roof liner 8 is located substantially parallel to the inner shell 3. During the sliding-on process, the respective undercut sliding surfaces 12 and 14 of the first guide elements 11 and the second guide elements 13 respectively come into engagement. The sliding-on process is complete as soon as a defined relative position of inner shell 3 and roof liner 8 is reached.

Figure 3:
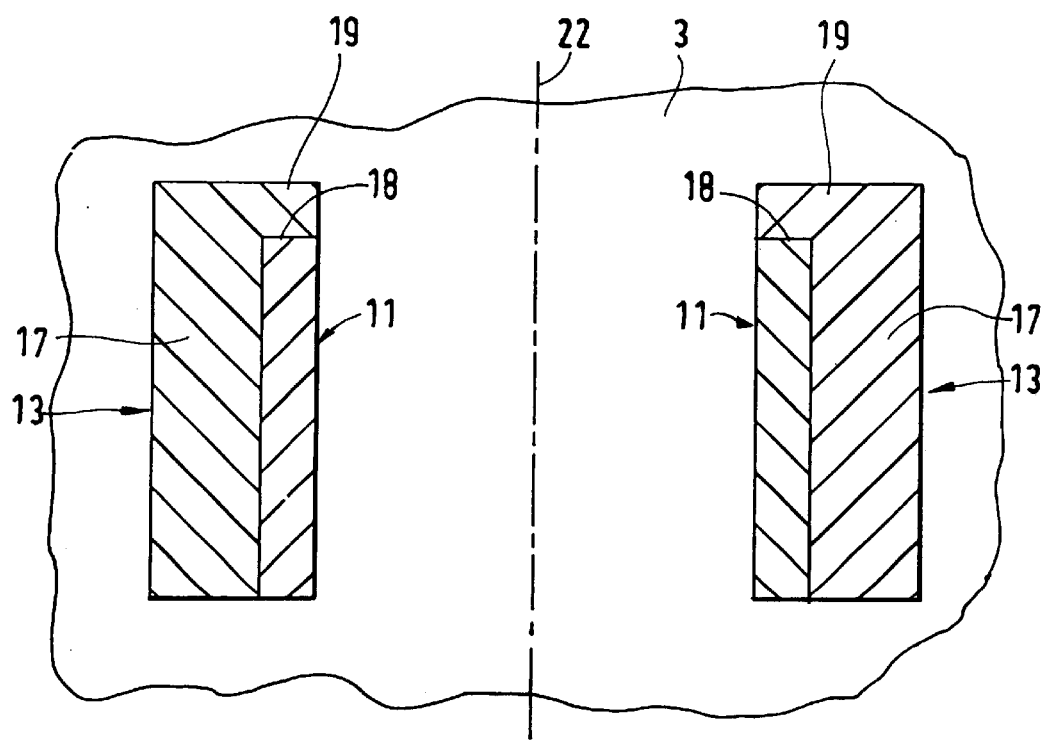
FIG. 3 shows a broken-away section through the first and second guide elements corresponding to the first embodiment, along section line III—III in FIG. 2.

As FIGS. 3 and 5 show, in conjunction with FIG. 2, the rail-like first and second guide elements 11, 13 are each formed of short profile portions and arranged in pairs. Pairs are provided at a plurality of spaced attachment locations on the roof liner 8 and the inner shell 3 respectively. As is shown in FIG. 5, taking the inner shell 3 as an example, there may be four spaced attachment locations 15. The first guide elements 11 are provided at corresponding attachment locations on the roof liner 8.

The rail-like first guide elements 11 are formed at each of their attachment locations of paired, mutually spaced angular profile portions, as shown in FIG. 2 in conjunction with FIG. 3. These angular profile portions are arranged with their arms 16 parallel to the roof liner 8 pointing in opposite directions. As is likewise revealed by FIG. 2, the complementary rail-like second guide elements 13 are likewise formed of paired, mutually spaced angular profile portions, but their arms 17 parallel to the inner shell 3 point towards one another.

As is clear from FIG. 3, the first and second guide elements 11, 13 are arranged parallel to one another in pairs at each attachment location and, moreover, are oriented parallel to one another in relation to all the attachment locations, as is revealed by FIG. 5 in relation to the second guide elements 13.

Limit stops 18 are fitted on the first or second guide elements 11, 13 (in the example illustrated on the second guide elements 13, however). In the example illustrated, these limit stops are formed by projections 19 of the arms 17, as is revealed by FIGS. 2, 3 and 5. When the roof liner 8 is attached to the inner shell 3, the limit stops 18 limit the displacement path of the roof liner 8 when the planned desired relative position is reached between the roof liner 8 and the inner shell 3. Only when this set relative position is reached, is the roof liner 8 connected with the bodywork frame 5 via the connecting weather-strip 9.

In the second embodiment of the guide elements, shown in FIGS. 4 and 6, the first and second guide elements 11', 13' are arranged in pairs converging mutually at each of the attachment locations 15, of which there are four for example, congruently in the direction of attaching displacement relative to associated surfaces, of which only the surfaces 20 on the first guide elements 11' and the surfaces 21 on the second guide elements 13' are shown in FIG. 4. The arrangement is such that both the first guide elements 11' and the second guide elements 13' are provided symmetrically at each of the attachment locations 15 relative to an axis of symmetry 22. The axes of symmetry 22 of the four attachment locations 15 in turn extend parallel to one another. Given this situation, the displacement path of the roof liner is limited, during attachment of the roof liner to the inner shell 3', in the desired fixed relative position between the roof liner and the inner shell 3' by meeting of the associated surfaces 20 and 21.

In both the above-described embodiments, the first guide elements 11 and 11' respectively are formed from the foamed plastic material of the roof liner 8 itself and the second guide elements 13, 13' are formed from the foamed plastic material of the inner shell 3 or 3' respectively itself and thus in each case in one piece.

The first guide elements 11 and 11' respectively on the roof liner 8 and/or the second guide elements 13 and 13' respectively on the inner shell 3 or 3' respectively may also be attached as initially separate profile portions by foam-embedding in the plastic material of the roof liner 8 and/or in the plastic material of the inner shell 3 or 3' (not shown).

Figure 7:
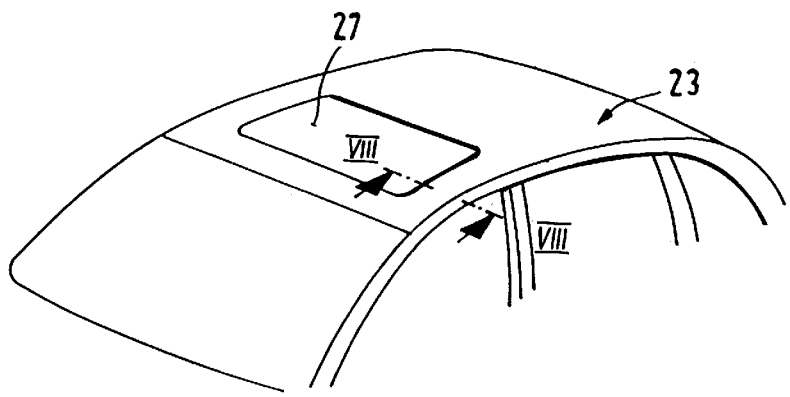
FIG. 7 is a perspective view of a vehicle roof with sunroof unit.
Figure 8:
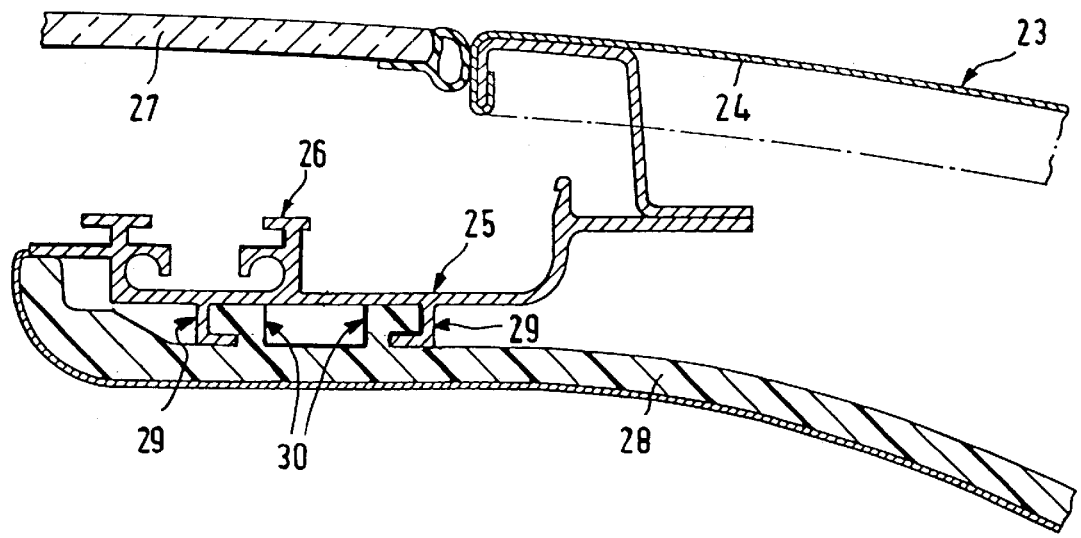
FIG. 8 shows a broken-away section through the vehicle roof along section line VIII—VIII in FIG. 7.

In the exemplary embodiment illustrated in FIGS. 7 and 8, the vehicle roof 23, which may likewise take the form of a roof module as described above and which is intended for attachment to a bodywork frame, is provided with a sunroof unit. In the example shown, a sunroof frame 25 connected firmly to the fixed roof skin 24 is associated with this sunroof unit, on which sunroof frame 25 guide rails 26 are located for guiding functional and driving elements (not shown) for the sliding cover 27. In the exemplary embodiment, the sliding cover 27 is a glass cover, but could also be constructed in the known way as a sheet metal cover. An inner shell of plastic material may again be foamed onto the inner surface of the roof skin 24, as is indicated in FIG. 8 by a dash-dotted line. FIGS. 7 and 8 show the sliding cover 27 in its closed position. In this exemplary embodiment, the roof liner 28 is releasably connected with the sunroof frame 25 in a manner still to be described.

The sunroof frame 25 is shaped from an extruded aluminum profile, on which, in the example shown, not only the guide rails 26 are formed, but also second guide elements 29 constructed as downwardly projecting profile portions of the sunroof frame 25. However, these guide elements 29 may also be constructed as separate components and be attached in a suitable manner to the sunroof frame (not shown). The second guide elements 29 correspond in arrangement and function to the second guide elements 13 or 13' of the above-described embodiments. They are likewise of rail-like construction and have undercut sliding surfaces, as described in relation to FIG. 2 with reference to the sliding surfaces 14.

In this exemplary embodiment too, the roof liner 28 is preformed as a separate component of foamed plastic material and provided on its upper side with rail-like first guide elements 30. These guide elements likewise comprise undercut sliding surfaces, as has been described with reference to FIG. 2 in relation to the sliding surfaces 12. As FIG. 8 shows, the first guide elements 30 and the second guide elements 29 are of complementary construction. In this exemplary embodiment too, to attach the roof liner 8 to the sunroof frame 25 the first guide elements 30 are slid, with the roof liner 28 parallel to the sunroof frame 25, onto the second guide elements 29 with their respective undercut sliding surfaces in engagement until a defined set relative position of sunroof frame 25 and roof liner 28 is reached. The defined relative position may be fixed by limit stops, when the first and second guide elements 30, 29 are oriented in parallel, as has been described in relation to FIGS. 3 and 5. However, the guide elements 29 and 30 may also be arranged mutually convergently to determine the defined relative position, as has been described in relation to FIGS. 4 and 5, one-piece extrusion-forming of the guide elements 29 with the frame 25 not then being possible, however.

FIG. 8 reveals that the first guide elements 30 are molded from the foamed plastic material of the roof liner 28 itself and thus in one piece. However, in this exemplary embodiment too the first guide elements may be attached by foam-embedding as separate components in the foamed plastic material of the roof liner 28.

In summary, a vehicle roof designed in particular for motor vehicles is proposed, in particular a roof module to be manufactured separately from the bodywork and connected with the bodywork frame, which consists substantially of a rigid roof skin, optionally an inner shell of foamed plastic material foamed thereon and a decorative roof liner of foamed plastic material. The roof module may be provided with an integral sunroof unit. The particular feature thereof is that the roof liner may be produced separately from the roof module and may be brought into releasable engagement with the inner shell or optionally with the sunroof frame of the sunroof unit by means of complementary, precisely fitting guide elements, i.e. may be replaced.

We claim:

1. A vehicle roof, comprising:
    a rigid roof skin having an inner surface;
    an inner shell of plastic material secured to said inner surface;
    a roof liner selectively connected to said inner shell, the roof liner having an upper side with rail-like first guide elements having sliding surfaces on said upper side; and
    rail-like second guide elements having sliding surfaces on said inner shell, said second guide elements cooperating with said first guide elements such that said first guide elements are slidably and removably received by said second guide elements, with said sliding surfaces in engagement, to selectively attach said roof liner to said inner shell.

2. The vehicle roof according to claim 1, wherein said first and second guide elements comprise short profile portions and are provided in pairs at a plurality of mutually spaced attachment locations on said roof liner or said inner shell, respectively.

3. The vehicle roof according to claim 2, wherein said first guide elements comprise paired, mutually spaced angular profile portions at each said attachment location, wherein arms parallel to said roof liner point in opposite directions, while said second guide elements comprise paired, mutually spaced angular profile portions, wherein arms parallel to said inner shell point towards one another.

4. The vehicle roof according to claim 2, wherein said first and second guide elements are arranged parallel to one another in pairs at each said attachment location.

5. The vehicle roof according to claim 2, wherein said first and second guide elements are arranged at each said attachment location so as to converge congruently in pairs in the direction of attachment displacement and wherein the first and second guide elements cooperate to limit movement between said roof liner and said inner shell during attachment.

6. The vehicle roof according to claim 1, including limit stops associated with said first and second guide elements to limit displacement of the roof liner relative to said inner shell during attachment upon reaching a desired relative position between said roof liner and said inner shell.

7. The vehicle roof according to claim 1, wherein said roof liner and said first guide elements are formed from foamed plastic material and said inner shell and said second guide elements are formed from foamed plastic material.

8. The vehicle roof according to claim 1, wherein said first guide elements are at least partially embedded in a plastic material of the roof liner.

9. A vehicle roof according to claim 1, wherein said second guide elements are at least partially embedded in a plastic material of the inner shell.

\* \* \* \* \*